US009252946B2

(12) United States Patent
Ranghuram et al.

(10) Patent No.: US 9,252,946 B2
(45) Date of Patent: Feb. 2, 2016

(54) METHOD AND SYSTEM TO SECURELY MIGRATE AND PROVISION VIRTUAL MACHINE IMAGES AND CONTENT

(71) Applicant: Intel Corporation, Santa Clara, CA (US)

(72) Inventors: Yeluri Ranghuram, San Jose, CA (US); Steve Orrin, Santa Clara, CA (US); Alberto J. Munoz, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/550,295

(22) Filed: Nov. 21, 2014

(65) Prior Publication Data

US 2015/0082031 A1 Mar. 19, 2015

Related U.S. Application Data

(62) Division of application No. 13/629,128, filed on Sep. 27, 2012, now Pat. No. 8,924,720.

(51) Int. Cl.
*H04L 9/08* (2006.01)
*H04L 9/32* (2006.01)
*H04L 29/06* (2006.01)
*G06F 9/455* (2006.01)

(52) U.S. Cl.
CPC .......... *H04L 9/0825* (2013.01); *G06F 9/45533* (2013.01); *H04L 9/083* (2013.01); *H04L 9/3234* (2013.01); *H04L 63/062* (2013.01); *H04L 63/0442* (2013.01); *H04L 2463/062* (2013.01)

(58) Field of Classification Search
CPC ... H04L 9/0825; H04L 63/062; H04L 9/3234; H04L 9/083; H04L 63/0442; H04L 2463/062; G06F 9/45533
See application file for complete search history.

(56) References Cited

U.S. PATENT DOCUMENTS

| 6,098,056 A * | 8/2000 | Rusnak et al. .................. 705/75 |
| 8,176,336 B1 * | 5/2012 | Mao ........................ H04L 9/006 713/189 |
| 8,924,720 B2 | 12/2014 | Raghuram et al. |

(Continued)

OTHER PUBLICATIONS

"Trusted Computing," Wikipedia, available at http://en.wikipedia.org/wiki/Trusted_Computing, printed Jun. 5, 2013.

(Continued)

*Primary Examiner* — Darren B Schwartz
(74) *Attorney, Agent, or Firm* — Barnes & Thornburg LLP

(57) ABSTRACT

A method, device, and system for securely migrating and provisioning a virtual machine image to a host device of a cloud service provider environment (CSPE) is disclosed. A customer device encrypts a virtual machine image (VMI) and stores the VMI in the CSPE. The host device retrieves the encrypted VMI from the object store and sends host trust data (including a symmetric key extracted from the encrypted VMI, the symmetric key being encrypted with the customer public key) to a key management server for trust attestation. If the key management server successfully attests the host device, the key management server decrypts the encrypted symmetric key using the customer private key and re-encrypts the symmetric key using the host public key. The host device receives the re-encrypted symmetric key from the key management server, decrypts it using the host private key, and decrypts the encrypted VMI using the symmetric key.

14 Claims, 9 Drawing Sheets

(56) References Cited

U.S. PATENT DOCUMENTS

| | | |
|---|---|---|
| 2002/0004902 A1 | 1/2002 | Toh et al. |
| 2003/0204720 A1 | 10/2003 | Schoen et al. |
| 2005/0114687 A1* | 5/2005 | Zimmer ............ G06F 12/1425 713/193 |
| 2006/0020781 A1* | 1/2006 | Scarlata et al. ............ 713/100 |
| 2006/0093150 A1 | 5/2006 | Reddy et al. |
| 2006/0256108 A1* | 11/2006 | Scaralata ............ G06F 21/57 345/418 |
| 2007/0300221 A1 | 12/2007 | Hartz et al. |
| 2009/0094673 A1* | 4/2009 | Seguin et al. .................. 726/1 |
| 2009/0154709 A1 | 6/2009 | Ellison |
| 2009/0240953 A1 | 9/2009 | Paul |
| 2010/0169948 A1* | 7/2010 | Budko et al. .................. 726/1 |
| 2011/0173427 A1* | 7/2011 | Merkin et al. .................. 713/2 |
| 2011/0246778 A1* | 10/2011 | Duane ........................ 713/176 |
| 2011/0271279 A1* | 11/2011 | Pate ............................. 718/1 |
| 2011/0293097 A1 | 12/2011 | Maino et al. |
| 2011/0302400 A1* | 12/2011 | Maino et al. .................. 713/2 |
| 2011/0302415 A1 | 12/2011 | Ahmad et al. |
| 2013/0007889 A1* | 1/2013 | McCloy .................. G06F 8/61 726/26 |
| 2013/0086383 A1 | 4/2013 | Galvao de Andrade et al. |
| 2013/0111205 A1 | 5/2013 | Biswas |
| 2013/0212388 A1 | 8/2013 | D'Souza et al. |
| 2013/0275752 A1 | 10/2013 | Zhang et al. |
| 2014/0082349 A1 | 3/2014 | Zarfross, III et al. |
| 2015/0134965 A1* | 5/2015 | Morenius et al. ............ 713/172 |
| 2015/0261554 A1* | 9/2015 | Kotani ................ G06F 9/45533 718/1 |

OTHER PUBLICATIONS

"Intel Cloud Builders Guide: Cloud Design and Deployment on Intel Platforms, Trusted Compute Pools with Parallels," 2010.

* cited by examiner

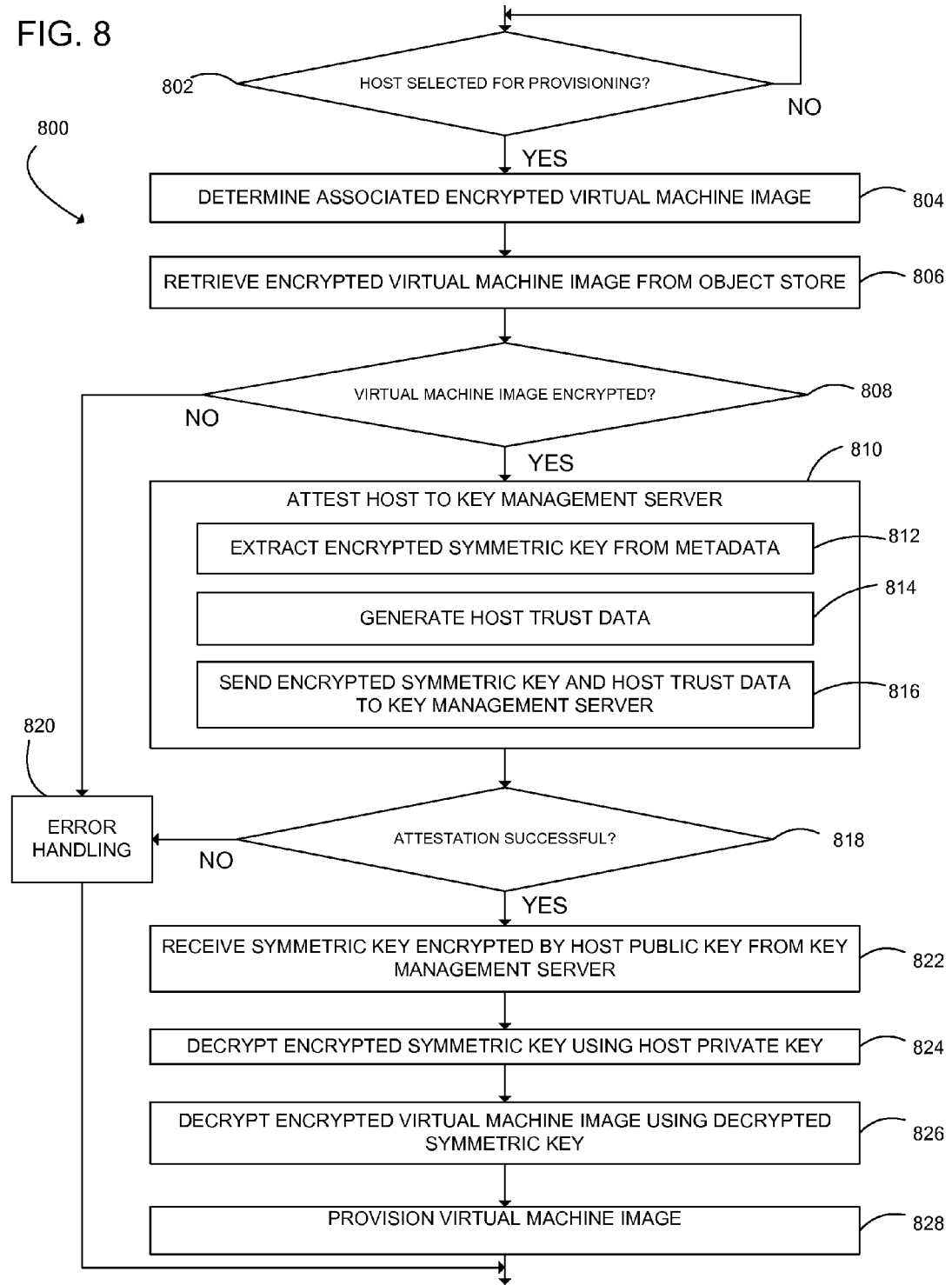

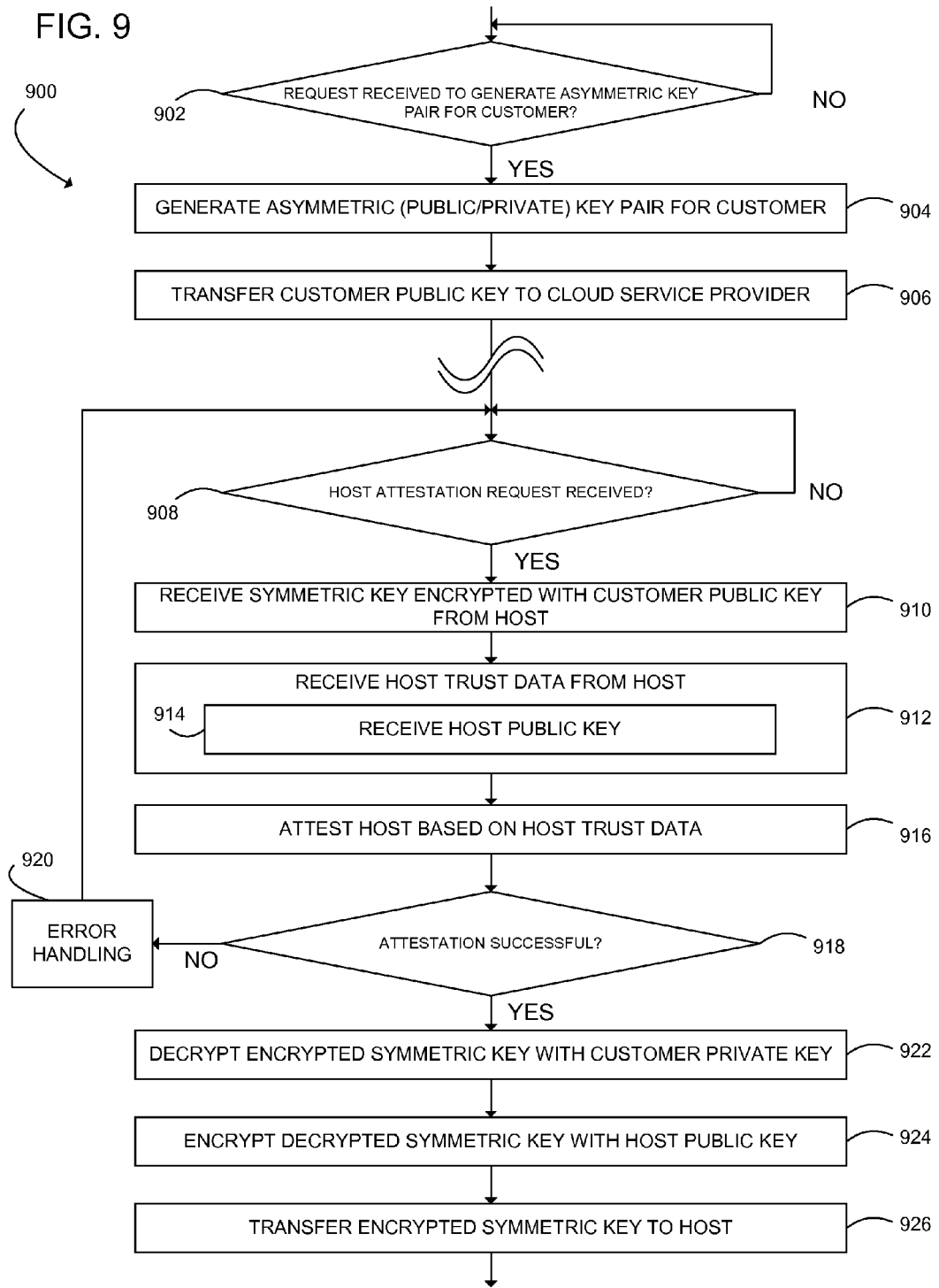

METHOD AND SYSTEM TO SECURELY MIGRATE AND PROVISION VIRTUAL MACHINE IMAGES AND CONTENT

CROSS-REFERENCE TO RELATED APPLICATION

This application is a divisional application of U.S. application Ser. No. 13/629,128, entitled "A Method and System to Securely Migrate and Provision Virtual Machine Images and Content," which was filed on Sep. 27, 2012.

BACKGROUND

The use of cloud computing environments is being adopted at a rapid pace, particularly by businesses. Software development companies have introduced numerous applications and solutions directed toward virtualization. Although virtual machines may be run on the same system in which the native operating system is located, enterprises are tending to migrate toward a system in which the virtual machine image is run on a host device within a cloud computing environment.

Cloud computing and virtual machine images allow enterprises to deploy virtual desktops efficiently and at a low cost. The use of cloud computing effectively eliminates the need for an enterprise to directly or remotely install desktop applications on each local client within the enterprise environment. When enterprises use such cloud computing environments, the virtual machine images are stored in an object store of the cloud service provider. A host device of the cloud service provider may then be chosen for provisioning the virtual machine image. As such, virtual machine images and data are stored on computing devices outside the control of the enterprise and protection of confidential information is limited.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 8 is a simplified flow diagram of at least one embodiment of a method for securely running virtual machine images on the host computing device of FIG. 1; and FIG. 9 is a simplified flow diagram of at least one embodiment of a method for securely exchanging keys through the key management server in the system of FIG. 1.

DETAILED DESCRIPTION OF THE DRAWINGS

Figure 1:
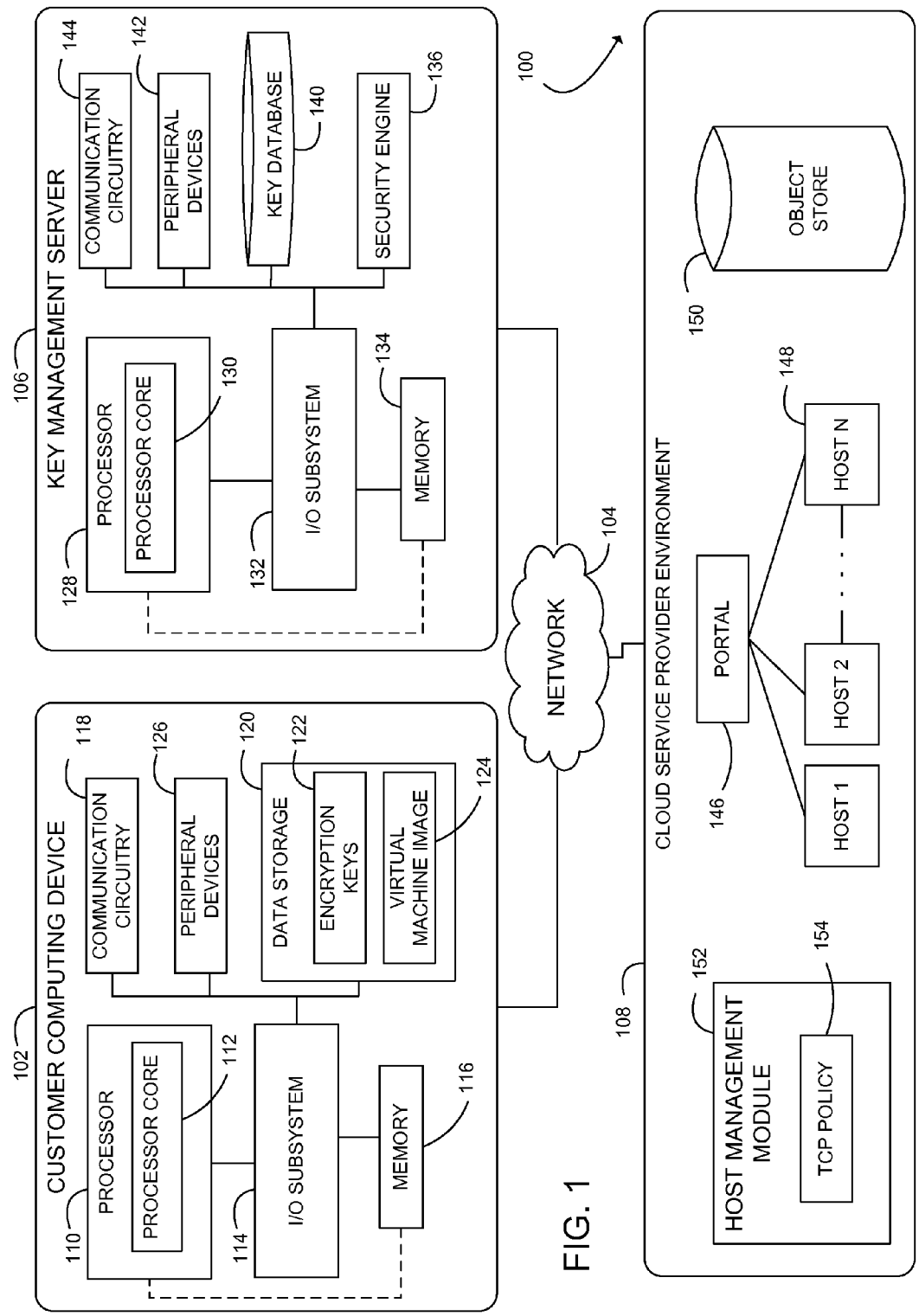
FIG. 1 is a simplified block diagram of at least one embodiment of a system for securely transmitting virtual machine images in a cloud computing environment.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions carried by or stored on a transitory or non-transitory machine-readable (e.g., computer-readable) medium, which may be read and executed by one or more processors. A machine-readable medium may be embodied as any device, mechanism, or physical structure for storing or transmitting information in a form readable by a machine (e.g., a computing device). For example, a machine-readable medium may be embodied as read only memory (ROM); random access memory (RAM); magnetic disk storage media; optical storage media; flash memory devices; mini- or micro-SD cards, memory sticks, electrical signals, and others.

In the drawings, specific arrangements or orderings of schematic elements, such as those representing devices, modules, instruction blocks, and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements may not be shown in the drawings so as not to obscure the disclosure. In addition, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

Referring now to FIG. 1, a system 100 for securely transmitting virtual machine images in a cloud computing environment includes a customer computing device 102, a key management server 106, and a cloud service provider environment 108. In use, as discussed in more detail below, the customer computing device 102 may securely transfer a virtual machine image environment to an object store 150 of the cloud service provider environment 108 via a network 104. The virtual machine image may be subsequently provisioned on a host computing device 148 of the cloud service provider environment 108. As discussed in more detail below, the transfer, storage, and provisioning of the virtual machine image is protected via use of a number of cryptographic key pairs, which are managed by the key management server 106.

Although only one customer computing device 102, one network 104, one key management server 106, and one cloud service provider environment 108 are illustratively shown in FIG. 1, the system 100 may include any number of customer computing devices 102, networks 104, key management servers 106, and cloud service provider environments 108 in other embodiments. For example, in some embodiments, the customer computing device 102 may transfer virtual machine images to object stores 150 of different cloud service provider environments 108.

The customer computing device 102 may be embodied as any type of computing device capable of performing the functions described herein. For example, the customer computing device 102 may be embodied as an enterprise-level server, a desktop computer, a laptop computer, a mobile internet device, a handheld computer, a smart phone, a personal digital assistant, a telephony device, or other computing device. In the illustrative embodiment of FIG. 1, the customer computing device 102 includes a processor 110, an I/O subsystem 114, a memory 116, communication circuitry 118, a data storage device 120, and one or more peripheral devices 126. In some embodiments, several of the foregoing components may be incorporated on a motherboard of the customer computing device 102, while other components may be communicatively coupled to the motherboard via, for example, a peripheral port. Furthermore, it should be appreciated that the customer computing device 102 may include other components, sub-components, and devices commonly found in a computer and/or computing device, which are not illustrated in FIG. 1 for clarity of the description.

The processor 110 of the customer computing device 102 may be embodied as any type of processor capable of executing software/firmware, such as a microprocessor, digital signal processor, microcontroller, or the like. The processor 110 is illustratively embodied as a single core processor having a processor core 112. However, in other embodiments, the processor 110 may be embodied as a multi-core processor having multiple processor cores 112. Additionally, the customer computing device 102 may include additional processors 110 having one or more processor cores 112.

The I/O subsystem 114 of the customer computing device 102 may be embodied as circuitry and/or components to facilitate input/output operations with the processor 110 and/or other components of the customer computing device 102. In some embodiments, the I/O subsystem 114 may be embodied as a memory controller hub (MCH or "northbridge"), an input/output controller hub (ICH or "southbridge"), and a firmware device. In such embodiments, the firmware device of the I/O subsystem 114 may be embodied as a memory device for storing Basic Input/Output System (BIOS) data and/or instructions and/or other information (e.g., a BIOS driver used during booting of the customer computing device 102). However, in other embodiments, I/O subsystems having other configurations may be used. For example, in some embodiments, the I/O subsystem 114 may be embodied as a platform controller hub (PCH). In such embodiments, the memory controller hub (MCH) may be incorporated in or otherwise associated with the processor 110, and the processor 110 may communicate directly with the memory 116 (as shown by the hashed line in FIG. 1). Additionally, in other embodiments, the I/O subsystem 114 may form a portion of a system-on-a-chip (SoC) and be incorporated, along with the processor 110 and other components of customer computing device 102, on a single integrated circuit chip.

The processor 110 is communicatively coupled to the I/O subsystem 114 via a number of signal paths. These signal paths (and other signal paths illustrated in FIG. 1) may be embodied as any type of signal paths capable of facilitating communication between the components of the customer computing device 102. For example, the signal paths may be embodied as any number of wires, cables, light guides, printed circuit board traces, via, bus, intervening devices, and/or the like.

The memory 116 of the customer computing device 102 may be embodied as or otherwise include one or more memory devices or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM) devices, flash memory devices, and/or other volatile and/or non-volatile memory devices. The memory 116 is communicatively coupled to the I/O subsystem 114 via a number of signal paths. Although only a single memory device 116 is illustrated in FIG. 1, the customer computing device 102 may include additional memory devices in other embodiments. Various data and software may be stored in the memory device 116. For example, one or more operating systems, applications, programs, libraries, and drivers that make up the software stack executed by the processor 110 may reside in memory 116 during execution. Furthermore, software and data stored in memory 116 may be swapped between the memory 116 and the data storage 120 as part of memory management operations.

The communication circuitry 118 of the customer computing device 102 may be embodied as any number of devices and circuitry for enabling communications between the customer computing device 102 and remote computing devices (e.g., the cloud service provider environment 108) over the network 104. The network 104 may be embodied as any number of various wired and/or wireless communication networks. For example, the network 104 may be embodied as or otherwise include a local area network (LAN), a wide area network (WAN), or a publicly-accessible, global network such as the Internet. Additionally, the network 104 may include any number of additional devices to facilitate communication between the customer computing device 102, the key management server 106, and the cloud service provider environment 108. The customer computing device 102, the key management server 106, and the cloud service provider environment 108 may use any suitable communication protocol to communicate with one another over the network 104 depending on, for example, the particular type of network(s) 104.

The data storage device(s) 120 may be embodied as any type of device or devices configured for the short-term or long-term storage of data such as, for example, memory devices and circuits, memory cards, hard disk drives, solid-state drives, or other data storage devices. For example, the confidential, unencrypted virtual machine image(s) 124 to be to be stored in the object store 150 of the cloud service provider environment 108 may be stored in the data storage device 120. Additionally, as discussed in more detail below, one or more encryption keys 122 may be stored in a secure location of the data storage device 120 for use in encrypting the virtual machine image 124. In some embodiments, the virtual machine image 124 and/or encryption keys 122 may be stored in one or more secure partitions of the data storage device(s) 120.

The peripheral devices 126 of the customer computing device 102 may include any number of peripheral or interface devices. For example, the peripheral devices 126 may include a display, a keyboard, a mouse, external speakers, and/or other peripheral devices. The particular devices included in the peripheral devices 126 may depend upon, for example, the intended use of the customer computing device 102. The peripheral devices 126 are communicatively coupled to the I/O subsystem 114 via a number of signal paths thereby allowing the I/O subsystem 114 and/or processor 110 to receive inputs from and send outputs to the peripheral devices 126.

The key management server 106 may be embodied as any type of data server or other computing device capable of performing the functions described herein. In the illustrative embodiment of FIG. 1, the key management server 106 includes a processor 128, an I/O subsystem 132, a memory 134, a security engine 136, a key database 140, one or more peripheral devices 142, and communication circuitry 144. In some embodiments, several of the foregoing components may be incorporated on a motherboard of the key management server 106, while other components may be communicatively coupled to the motherboard via, for example, a peripheral port. Furthermore, it should be appreciated that the key management server 106 may include other components, sub-components, and devices commonly found in a sever and/or computing device, which are not illustrated in FIG. 1 for clarity of the description. The processor 128, the processor core 130, the I/O subsystem 132, the memory 134, the one or more peripheral devices 142, and the communication circuitry 144 of the key management server 106 may be similar to the corresponding components of the customer computing device 102 as described above. As such, the description of such similar components of the customer computing device 102 is equally applicable to the similar components of the key management server 106 and are not repeated herein for clarity of the description. Additionally, in some embodiments, the key management server 106 also includes a the key database 140 that may securely store one or more encryption keys, which are used by the security engine to encrypt and decrypt the virtual machine images 124 and associated cryptographic keys as discussed in more detail below.

The cloud service provider environment 108 may be embodied as any type of cloud computing environment capable of performing the functions described herein. In the illustrative embodiment of FIG. 1, the cloud service provider environment 108 is a cloud computing environment of a provider of cloud computing services. The cloud service provider environment 108 illustratively includes a portal 146, one or most host computing devices 148, an object store 150, and a host management module 152. It should be appreciated that the cloud service provider environment 108 may include other components, sub-components, and devices commonly found in a cloud computing environment, which are not illustrated in FIG. 1 for clarity of the description. Additionally, in some embodiments, the key management server 106 may be included in the cloud server provider environment 108 (i.e., controlled by the cloud server provider rather than, for example, a third-party authentication/certification provider).

The portal 146 of the cloud service provider environment 108 may be embodied as any number of devices, networks, and circuitry for enabling communications between the cloud service provider environment 108 and remote computing devices (e.g., the customer computing device 102 and the key management server 106) over the network 104. The portal 146 may further be embodied as any number of devices, networks, and circuitry for enabling communications between the one or more host computing devices 148 within cloud service provider environment 108. In the illustrative embodiments, the cloud service provider environment 108 includes one or more host computing devices 148. As discussed in further detail below, the portal 146 may be used by the cloud service provider environment 108 in selecting a particular host computing device 148 for provisioning a virtual machine image 124 from the object store 150. As such, each of the one or more host computing devices 148 may be embodied as any type of computing device capable of performing the functions described herein.

Further, in securely transmitting and running a virtual machine image with the system 100, the customer computing device 102 may upload an encrypted virtual machine image to the object store 150 of the cloud service provider environment 108. To facilitate the secure provisioning of the virtual machine image, the cloud service provider environment 108 may also include a host management module 152. The host management module 152 may, for example, implement a Trusted Compute Pool (TCP) policy 154 to determine which of the one or most host computing devices 148 to select for provisioning the virtual machine image 124 as discussed in more detail below.

Figure 2:
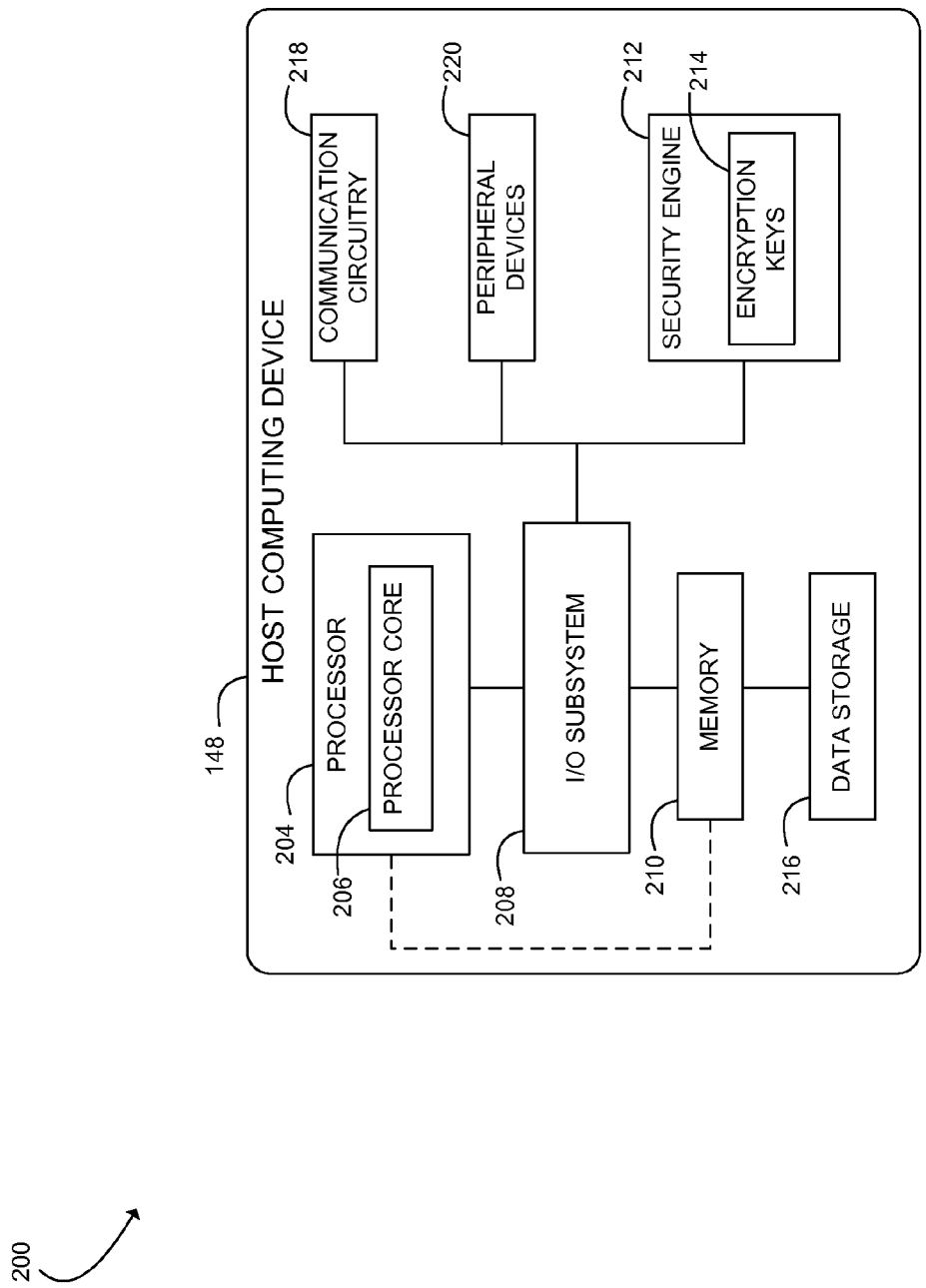
FIG. 2 is a simplified block diagram of at least one embodiment of a host computing device of the system of FIG. 1.

Referring now to FIG. 2, an illustrative host computing device 148 of the cloud server provider environment 108 is shown. The host computing device 148 may be similar to the customer computing device 102 and/or the key management server 106 described above with regard to FIG. 1. As such, the host computing device 148 may be embodied as any type of computing device, such a rack-mounted server or computer, capable of performing the functions described herein. In the illustrative embodiment of FIG. 2, the host computing device 148 includes a processor 204, a processor core 206, an I/O subsystem 208, a memory 210, a security engine 212, a data storage device 216, communication circuitry 218, and one or more peripheral devices 220. In some embodiments, several of the foregoing components may be incorporated on a motherboard of the host computing device 148, while other components may be communicatively coupled to the motherboard via, for example, a peripheral port. Furthermore, it should be appreciated that the host computing device 148 may include other components, sub-components, and devices commonly found in a cloud service computer and/or computing device, which are not illustrated in FIG. 2 for clarity of the description. The processor 204, the processor core 206, the I/O subsystem 208, the memory 210, the security engine 212, the data storage device 216, the communication circuitry 218, and the one or more peripheral devices 220 of the host computing device 148 may be similar to the corresponding components of the customer computing device 102 and/or key management server 106 as described above. As such, the description of such similar components of the customer computing device 102 and/or key management server 106 is equally applicable to the similar components of the key management server 106 and are not repeated herein for clarity of the description. In some embodiments, the security engine 212 of the host computing device 148 also includes one or more encryption keys 214 to perform various cryptographic functions as discussed below.

Figure 3:
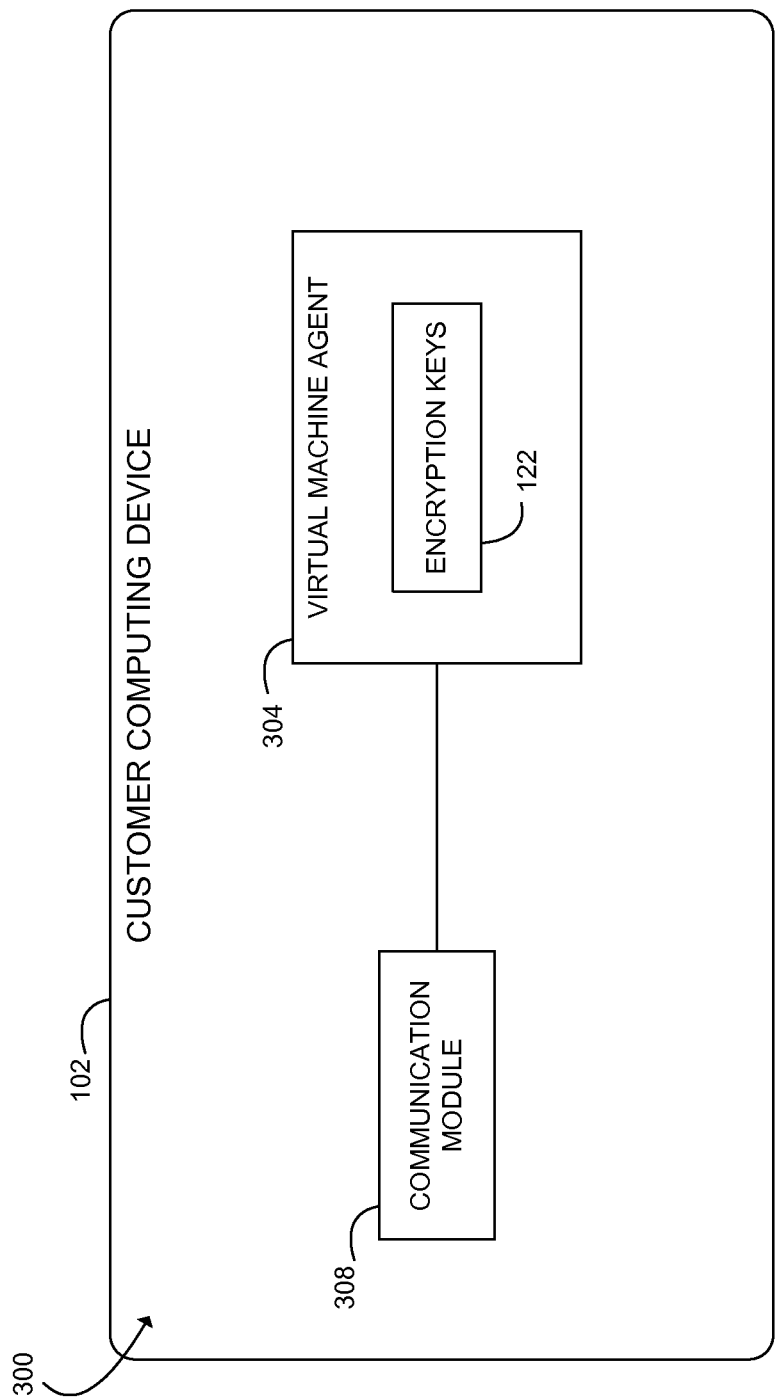
FIG. 3 is a simplified block diagram of at least one embodiment of an environment of a customer computing device of the system of FIG. 1.

In use, as shown in FIG. 3, the customer computing device 102 may establish an environment 300 for securely transmitting virtual machine images 124. The environment 300 in the illustrative embodiment includes a virtual machine agent 304 and a communication module 308. The virtual machine agent 304 may be executed by the processor 110 to perform security and cryptographic processes to securely transmit a virtual machine image 124. In some embodiments, the virtual machine agent 304 may be embodied as, or otherwise include, a security co-processor of the customer computing device 102, a cryptographic accelerator incorporated into the processor 110, or a stand-alone cryptographic software/firmware. The virtual machine agent 304 may encrypt the virtual machine image 124 using a symmetric cryptographic key, which may be generated using the virtual machine agent 304. The symmetric cryptographic key is subsequently encrypted using a public key of the customer computing device 102. As discussed below, in some embodiments, the public key may be generated by the key management server 106. As such, the virtual machine agent 304 may access the virtual machine image 124 and encryption keys 122 stored in the data storage device(s) 120 while performing cryptographic processes. Alternatively, the encryption keys 122 may be stored in secure memory accessible to the virtual machine agent 304. In some embodiments, the virtual machine agent 304 of the customer computing device 102 may update metadata of the encrypted and/or decrypted virtual machine image 124 to provide an indication of the encryption state of the virtual machine image 124. The virtual machine agent 304 may also be configured to communicate with a communication module 308. The communication module 308 may handle the communication between the customer computing device 102 and remote computing devices, including the cloud service provider environment 108, through the network 104. Each of the virtual machine agent 304 and the communication module 308 may be embodied as hardware, software, firmware, or a combination thereof.

Figure 4:
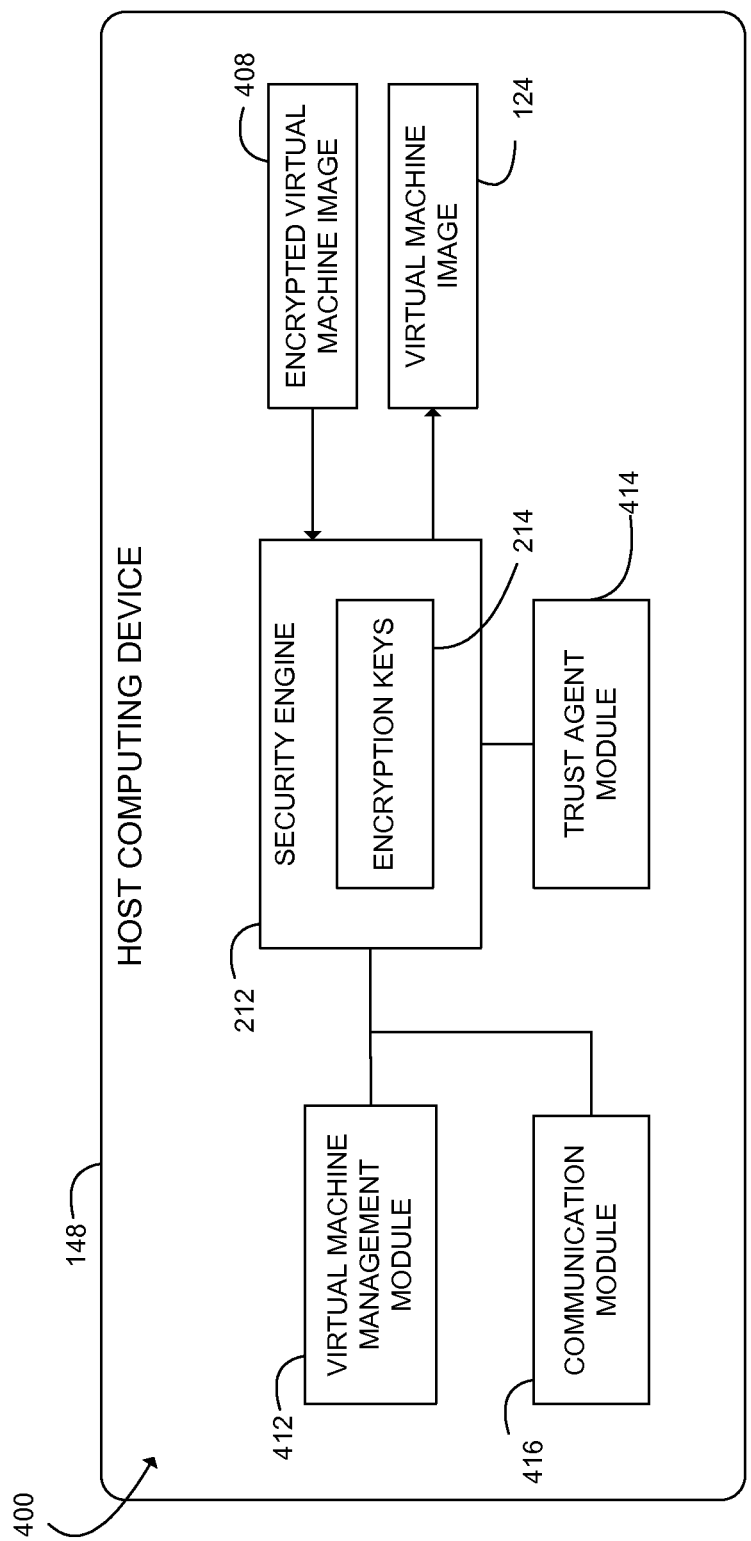
FIG. 4 is a simplified block diagram of at least one embodiment of an environment of a host computing device of the system of FIG. 1.

Referring now to FIG. 4, similar to the customer computing device 102, the host computing device 148 may establish an environment 400 for securely decrypting the virtual machine image 124. The environment 400 includes a security engine 212, a virtual machine management module 412, a trust agent module 414, and a communication module 416. In some embodiments, the security engine 212 may be executed by the processor 204 to perform security and cryptographic procedures to securely provision the virtual machine image 124. In some embodiments, the security engine 212 may be embodied as, or otherwise include, a security co-processor of the host computing device 148, a cryptographic accelerator incorporated into the processor 204, or a stand-alone cryptographic software/firmware. As discussed in further detail below, the security engine 212 may generate an asymmetric key pair including a host public key and a host private key. Further, the security engine 212 may receive a symmetric cryptographic key from the key management server 106 that has been encrypted with the host public key. The decrypted symmetric key is then subsequently used to decrypt the encrypted virtual machine image 408 so that the host computing device 148 may provision the decrypted virtual machine image 124. As such, the security engine 212 may access the encryption keys 214 while performing cryptographic routines. In some embodiments, the encryption keys 214 may be stored in secure memory accessible to the security engine 212, whereas in other embodiments, the encryption keys 214 may be stored in the data storage device 216 or system memory 210 of the host computing device 148. Upon successful decryption of the encrypted virtual machine image 408, the virtual machine management module 412 is configured to provision the virtual machine image 124 (i.e., the decrypted form of the encrypted virtual machine image 408) on the host computing device 148.

The trust agent module 414 of the host computing device 148 may be used to attest the host computing device 148 itself to the key management server 106. In doing so, the trust agent module 414 generates trust data associated with the hardware of the host computing device 148 to be transmitted to the key management server 106 as discussed in more detail in method 800 of FIG. 8. The communication module 416 may handle the communication between the host computing device 148 and remote computing devices through the portal 146 of the cloud service provider environment 108 and the network 104. In some embodiments, the network 104 may include a management network through which the key management server 106 communicates with remote devices. Each of the security engine 212, the virtual machine management module 412, the trust agent module 414, and the communication module 416 may be embodied as hardware, software, firmware, or a combination thereof.

Figure 5:
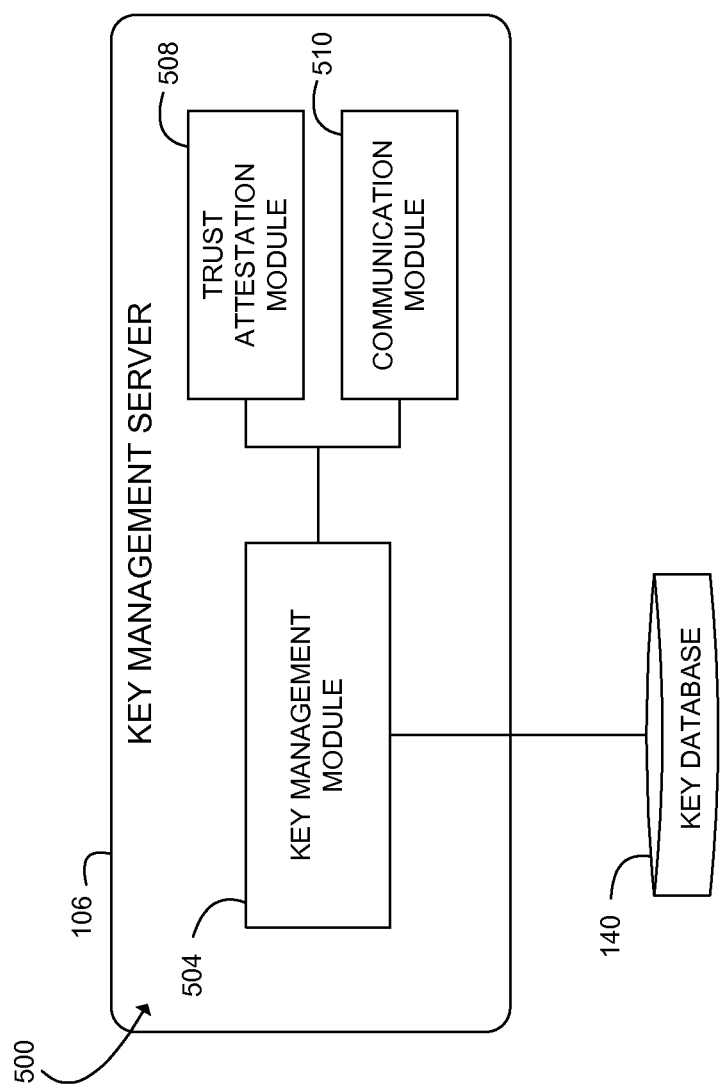
FIG. 5 is a simplified block diagram of at least one embodiment of an environment of a key management server of the system of FIG. 1.

Referring now to FIG. 5, the key management server 106 may establish an environment 500 for securely exchanging encryption keys 138 and attesting the selected host computing device 148. In the illustrative embodiment, the environment 500 includes a key management module 504, a trust attestation module 508, and a communication module 510. The key management module 504 may be executed by the processor 128 to generate and manage cryptographic keys. In other embodiments, the key management module 504 may be embodied as a security co-processor of the key management server 106, a cryptographic accelerator incorporated into the processor 128, or a standalone cryptographic software/firmware. During execution, the key management module 504 may generate an asymmetric key pair including a customer public key and a customer private key for a customer computing device 102 as discussed below. Furthermore, the key management module 504 may be executed to perform an exchange of keys encrypting a symmetric key; that is, the key management module 504 may decrypt a symmetric key encrypted with a customer public key and re-encrypt the symmetric key using a host public key as discussed in FIG. 9.

The trust attestation module 508 of the key management server 106 may be used to attest a host computing device 148 based on host trust data received from the trust agent module 414 of the host computing device 148 (e.g., based on historic trust information stored on the key management server 106). For example, in some embodiments, the host trust data is compared with a user's workload security requirements and a determination is made as to whether the host can support the security requirements of the workload. The communication module 510 may handle the communication between the key management server 106 and remote computing devices, including the cloud service provider environment 108 and the host computing device 148. Each of the key management module 504, the trust attestation module 508, and the communication module 510 may be embodied as hardware, software, firmware, or a combination thereof.

Figure 6:
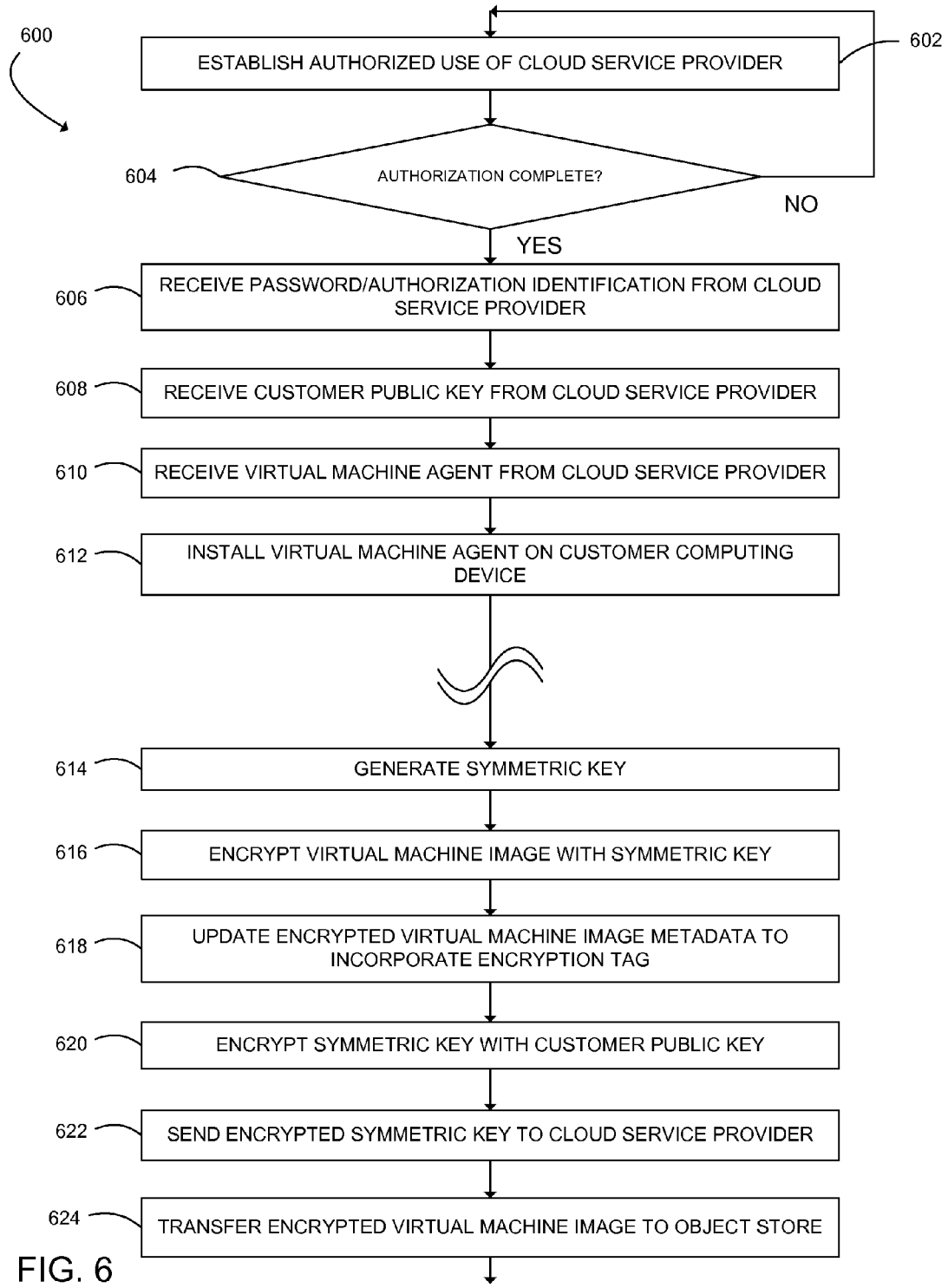
FIG. 6 is a simplified flow diagram of at least one embodiment of a method for securely transmitting virtual machine images with the customer computing device of FIG. 1.

Referring now to FIG. 6, one illustrative embodiment of a method 600 for securely transmitting virtual machine images, which may be executed by the customer computing device 102, begins with block 602. In block 602, the customer computing device 102 establishes authorized use of the cloud service provider environment 108. In other words, a customer may use the customer computing device 102 to register for an account with a particular cloud service provider. Doing so may enable the customer computing device 102 to access the cloud service provider environment 108. After the customer computing device 102 has been authorized to use the cloud service provider environment 108 in block 604, the customer computing device 102 may receive a password and authorization identification from the cloud service provider environment 108 in block 606. In other embodiments, the customer computing device 102 may be provided with other secure means of accessing the cloud service provider environment 108.

In the process of authorizing the user, the cloud service provider environment 108 may request the key management server 106 to generate an asymmetric key pair (see block 708 of FIG. 7), including a customer private key and a customer public key, for the customer computing device 102. As such, in block 608, the customer computing device 102 receives the customer public key generated by the key management server 106 through the cloud service provider environment 108. In some embodiments, the key management server 106 may generate or utilize a certificate authority to generate a public key certificate including the customer public key. In those embodiments, the customer computing device 102 may receive the public key certificate and then extract the customer public key. The public key certificate may be used to verify the validity and authenticity of the customer public key. Additionally, the cloud service provider environment 108 sends a virtual machine agent 304 to be installed on the customer computing device 102 in block 610. The virtual machine agent 304, as discussed above in FIG. 3, may be used by the customer computing device 102 to perform various cryptographic processes. In block 612, the customer computing device 102 installs the virtual machine agent 304 on the customer computing device 102. In some embodiments, the virtual machine agent 304 may be installed in the data storage device(s) 120 of the customer computing device 102. In other embodiments, however, it may be possible to install or run the virtual machine agent 304 from the memory 116 of the customer computing device 102.

Subsequently, in block 614, the customer computing device 102 generates a symmetric encryption key using the virtual machine agent 304 (or a security engine/co-processor of the customer computing device 102). The symmetric key may be generated using any suitable cryptographic procedure. Similarly, the symmetric key may be a block cipher or a stream cipher. In some embodiments, the symmetric key may be embodied as a session key generated from, or as a function of, another cryptographic key. Additionally, in some embodiments, the symmetric key may not be generated on the customer computing device 102 but instead generated on another computing device and securely transmitted to the customer computing device 102. The customer computing device 102 may store the symmetric key in secure memory in some embodiments.

In block 616, the customer computing device 102 may encrypt the virtual machine image 124 with the symmetric key generated in block 614. Additionally, in block 618, the virtual machine agent 304 may update the metadata of the encrypted virtual machine image to incorporate an encryption tag. The encryption tag may, for example, indicate that the virtual machine image is encrypted and may also indicate various details regarding the encryption such as the algorithm used. In some embodiments, the metadata of the encrypted virtual machine image may be embodied as an open virtualization format (OVF) manifest or package.

Subsequently, in block 620, the customer computing device 102 encrypts the symmetric key using the customer public key received from the cloud service provider environment 108 in block 608. It should be appreciated that public key encryption (i.e., asymmetric encryption) has substantially greater computational overhead than symmetric encryption. Therefore, by encrypting the virtual machine image 124 with a symmetric key and then encrypting only the symmetric key using a public substantially reduces the load on the processor 110 of the customer computing device 102.

In block 622, the customer computing device 102 sends the encrypted symmetric key to the cloud service provider environment 108 and, in block 624, the customer computing device 102 transfers the encrypted virtual machine image to the object store 150 of the cloud service provider environment 108. In some embodiments, the customer computing device 102 may send the encrypted symmetric key directly to the cloud service provider environment 108. In such embodiments, the cloud service provider environment 108 may subsequently forward the encrypted symmetric key to a host computing device 148 selected for provisioning or to the key management server 106. However, in other embodiments, the customer computing device 102 may use the virtual machine agent 304 to embed the encrypted symmetric key in the metadata of the encrypted virtual machine image that is uploaded to the object store 150 in block 624.

Figure 7:
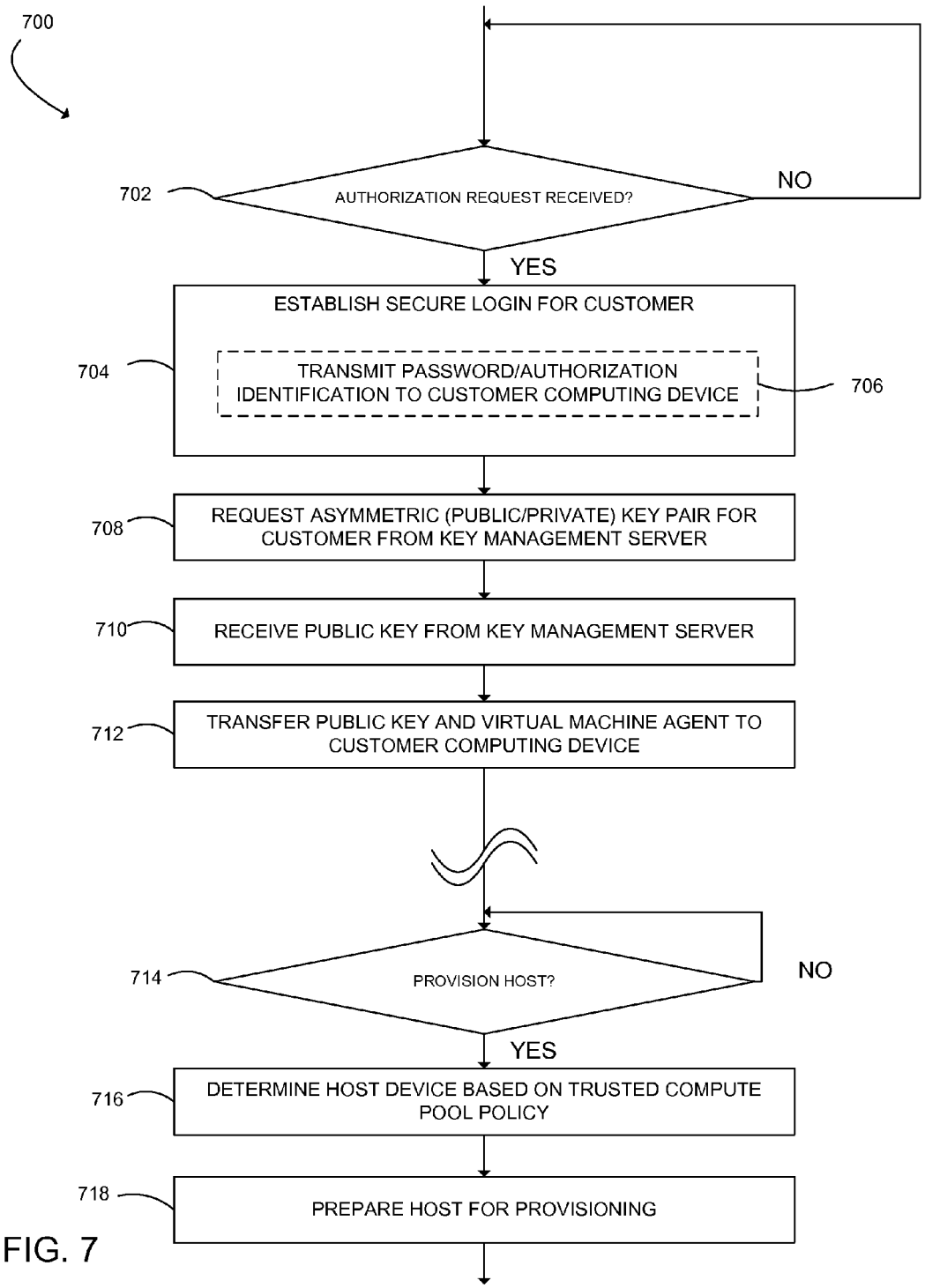
FIG. 7 is a simplified flow diagram of at least one embodiment of a method for securely transmitting virtual machine images with the cloud service provider environment of FIG. 1.

Referring now to FIG. 7, one illustrative embodiment of a method 700 for securely transmitting virtual machine images, which may be executed by the cloud service provider environment 108, begins with block 702. In block 702, the cloud service provider environment 108 determines whether it has received an authorization request from a customer computing device 102 (see block 602 of FIG. 6). If so, the cloud service provider environment 108 establishes authorized/secure login credentials for the customer computing device 102 in block 704. As discussed above, such establishment of authorized/secure login credentials may include generating a login/authorization identification and password for the customer computing device 102. In such embodiments, in block 706, the cloud service provider environment 108 may transmit those credentials (i.e., password and login) to the customer computing device 102.

In blocks 708, the cloud service provider environment 108 may request that an asymmetric key pair, including a customer private key and a customer public key, be generated by the key management server 106. As discussed below (see block 904 of FIG. 9), the asymmetric (i.e., public-private) key pair may be generated using any suitable cryptographic procedure. The key management server 106 may subsequently forward the customer public key of the asymmetric key pair to the cloud service provider environment 108, which is received in block 710. As discussed above, it should be appreciated that the key management server 106 may generate a public key certificate including the customer public key, which may be used to authenticate the customer public key. As such, in block 710, the cloud service provider environment 108 may in some embodiments receive a public key certificate containing and verifying the authenticity of the customer public key rather than the customer public key alone. In block 712, the cloud service provider environment 108 may forward the customer public key and/or public key certificate to the customer computing device 102. The cloud service provider environment 108 also transfers the virtual machine agent 304 to the customer computing device 102 in block 712.

Subsequently, in block 714, the cloud service provider environment 108 determines whether to provision one or more of the host computing devices 148. In some embodiments, the cloud service provider environment 108 may determine to provision a host computing device 148 in response to the customer computing device 102 uploading the encrypted virtual machine image to the object store 150 of the cloud service provider environment 108. In other embodiments, the customer computing device 102 may provide additional authorization or request for the cloud service provider environment 108 to begin the provisioning process. For example, the customer of the customer computing device 102 may be required to enter secure login credentials established in block 602 (see method 600 of FIG. 6). It should also be appreciated that, in some embodiments, there may be a significant time lapse between blocks 712 and 714 in method 700 (indicated by the double-tilde symbol in FIG. 7).

If the cloud service provider environment 108 has determined that provisioning of a host computing device 148 has been requested/authorized, the cloud service provider environment 108 determines a particular host computing device 148 to provision in block 716. That is, the cloud service provider environment 108 selects one or more of the host computing device(s) 148 of FIG. 1 for provisioning. In the illustrative embodiment, the particular host computing device 148 is selected as a function of a trusted compute pool (TCP) policy, which may indicate which one or more of the host computing devices 148 should be selected based on various criteria such as historic security data related to each host computing device 148, the customer provisioning request, and/or the like. In other embodiments, alternative host-selection policies may be implemented. Upon selecting the particular host computing device 148, the cloud service provider environment 108 may prepare the host computing device 148 for provisioning in block 718.

Referring now to FIG. 8, one illustrative embodiment of a method 800 for securely installing and executing virtual machine images, which may be executed by the host computing device 148, begins with block 802. As discussed above in the discussion of FIG. 7, the cloud service provider environment 108 selects a particular host computing device 148 for provisioning (e.g., based on a trusted compute pool policy). If the host computing device 148 is selected for provisioning in block 802, the host computing device 148 determines via the virtual machine management module 412, in block 804, which encrypted virtual machine image in the object store 150 of the cloud service provider environment 108 is associated with the provisioning request. As discussed above, the customer computing device 102 encrypts a virtual machine image 124 and uploads the encrypted virtual machine image to the object store 150. After the host computing device 148 associates this encrypted virtual machine image 408 with the provisioning request, the host computing device 148 retrieves the encrypted virtual machine image 408 from the object store 150 in block 806. The encrypted virtual machine image 408 may be stored in the data storage device 216 of the host computing device 148. Alternatively, the encrypted virtual machine image 408 may be stored in the memory 210, the security engine 212, or other secure memory of the host computing device 148.

In block 808, the host computing device 148 determines whether the virtual machine image associated with the provisioning request is encrypted. To do so, in some embodiments, the host computing device 148 may check the metadata of the retrieved virtual machine image for the encryption tag (or state thereof) incorporated therein by the customer computing device 102 (see block 618 of method 600 of FIG. 6). If the virtual machine image is not encrypted, the method 800 advances to block 820 in which the host computing device 148 performs an error handling procedure. In some circumstances, it may be beneficial or unnecessary to encrypt the virtual machine images being provisioning on the host computing device 148. As such, if the host computing device 148 detects in block 808 that the virtual machine image is not encrypted, the error handling mechanism may be configured to merely bypass the remainder of method 800 and provision the virtual machine image accordingly (e.g., via standard provisioning mechanisms). In other embodiments, the host computing device 148 may expect an encrypted virtual machine image. As such, upon detecting an unencrypted virtual machine image, the host computing device 148 may, for example, assume that it is malfunctioning and direct the host management module 152 of the cloud service provider environment 108 to select a different one of the one or more host computing device(s) 148 of FIG. 1 for provisioning. It should be appreciated that other error handling procedures may be used by the host computing device 148 in block 820. However, if the host computing device 148 determines that the virtual machine image is encrypted, the method 800 advances to block 810.

In some embodiments, the host computing device 148 may be attested to the key management server 106 in block 810. As discussed above, in some embodiments the customer computing device 102 may embed a symmetric key encrypted with the customer public key within the metadata of the encrypted virtual machine image. In such embodiments, the host computing device 148 may extract the encrypted symmetric key from the virtual machine image metadata in block 812. In block 814, the trust agent module 414 of the host computing device 148 may generate host trust data. The host trust data may be a function of the hardware components of the host computing device 148. In some embodiments, the host trust data may comprise a trusted platform module quote (TPM Quote) or other type of trust quote. Additionally, in some embodiments, the host trust data may include a public key of the host computing device 148. In block 816, the host computing device 148 transmits the encrypted symmetric key and the host trust data (with the host public key) to the key management server 106 for trust attestation.

In block 818, the host computing device 148 determines whether the key management server 106 has successfully attested the trust data sent in block 810. If the key management server 106 unsuccessfully attests the host computing device 148 (i.e., determines that the host computing device 148 is not trustworthy), the method 800 advances to block 820 in which error handling procedures are executed by the host computing device 148. However, upon successful attestation, the method 800 advances to block 822 in which the host computing device 148 receives the encrypted symmetric key from the key management server 106. As discussed in greater detail in the discussion of FIG. 9, the key management server 106 decrypts the encrypted symmetric key received by the host computing device 148 and re-encrypts the symmetric key with the public key of the host computing device 148. Therefore, the encrypted symmetric key received from the key management server 106 in block 822 is encrypted with the host public key.

In block 824, the host computing device 148 decrypts the encrypted symmetric key using the host private key. As discussed above, the private key is one-half of an asymmetric key pair. Although the public key was previously shared with the key management server 106 in block 810 and is generally publically available, the private key is kept secret. As such, the host private key of block 824 may be stored in a secure location of the host computing device 148. In some embodiments, the asymmetric key pair may be generated by a trusted platform module (TPM) of the security engine 212 using trusted execution technology (TXT). Embodiments of trusted execution technology (TXT) that may be used by the security engine 212 are described in more detail in PCT Application Serial No. PCT/US2012/023188, entitled "Remote Trust Attestation and Geo-Location of Servers and Clients in Cloud Computing Environments," which was filed on Jan. 30, 2012, and in U.S. patent application Ser. No. 13/431,437, entitled "Remote Trust Attestation and Geo-Location of Servers and Clients in Cloud Computing Environments," which was filed on Mar. 15, 2012. In such embodiments, the private key may be stored within the trusted platform module of the security engine 212. In other embodiments, the host private key may be stored in other secure memory of the host computing device 148. Alternatively, the private key may be stored in a secure location on a remote computing device and securely retrieved by the host computing device 148. After decrypting the encrypted symmetric key, the decrypted symmetric key may be used to decrypt the encrypted virtual machine image in block 826. As discussed above, such decryption process, and other encryption/decryption processes, may be performed by the security engine 212 of the host computing device 148. In block 828, the host computing device 148 may then provision the decrypted virtual machine image 124.

Referring now to FIG. 9, one illustrative embodiment of a method 800 for securely exchanging keys, which may be executed by the key management server 106, begins with block 902. In block 902, the key management server 106 determines whether a request has been received from the cloud service provider environment 108 to generate an asymmetric key pair for the customer computing device 102. If such a request is received, the key management server 106 generates an asymmetric key pair, including a customer public key and a customer private key, for the customer computing device 102 in block 904. It should be appreciated that each of a public key and private key is one half of an asymmetric key pair (i.e., public-private cryptographic key pair). Additionally, the asymmetric key pair may be generated by the key management module 504 using any suitable cryptographic procedure. For example, the asymmetric key pair may be generated using a Rivest-Shamir-Adleman (RSA) algorithm or elliptic curve cryptography. As discussed above, in some embodiments, the key management server 106 may generate or utilize a certificate authority to generate a public key certificate including the customer public key. In such embodiments, the public key certificate may be used to verify the authenticity of the included customer public key. In the illustrative embodiment, the key management server 106 may store the customer private key in the key database 140 of the key management server 106. In other embodiments, however, the customer private key may be stored in the memory 134, the security engine 136, a data storage device, or other secure memory of the key management server 106. In block 906, the key management server 106 transfers the customer public key and/or public key certificate to the cloud service provider environment 108. As discussed above in the discussion of FIG. 7, the cloud service provider environment 108 may then forward the public key and/or public key certificate to the customer computing device 102.

In block 908, the key management server 106 determines whether a host attestation request has been received. In some embodiments, the request may come directly from the host computing device 148. However, in other embodiments the request may come from the portal 146, the host management module 152, or other components of the cloud service provider environment 108. If a request to attest the host computing device 148 is received, the key management server 106 receives a symmetric key encrypted with the customer public key from the host computing device 148 (which may have been sent with the request) in block 910. In block 912, the key management server 106 receives host trust data from the host computing device 148 for trust attestation. The key management server 106 may also receive the public key of the host computing device 148 with, or independent of, the host trust data in block 914. As discussed above, the host trust data may be a function of the hardware components of the host computing device 148 and, in some embodiments, may comprise a trusted platform module quote or other type of trust quote. In block 916, the key management server 106 may attest the host computing device 148 based on the host trust data using the trust attestation module 508. In some embodiments, the key management server 106 may attest the host computing device 148 based on historic security information, quotas, threshold values, security parameters, and/or the like.

In block 918, the key management server 106 determines whether the host computing device 148 has been successfully attested (i.e., deemed trustworthy). If the attestation of the host computing device 148 is not successful, the method 900 may advance to block 920 in which the key management server 106 performs an error handling procedure. In the illustrative embodiments, for example, the method 900 merely returns from block 910 to block 908 in which the key management server 106 waits for another host attestation request. If the attestation is successful, the method 900 advances to block 922 in which the key management server 106 decrypts the encrypted symmetric key using the customer private key stored in the key database 140. After decrypting the encrypted symmetric key, the key management server 106 re-encrypts the decrypted symmetric key using the host public key received in block 914 with the host trust data of the host computing device 148. In block 926, the key management server 106 may transfer the re-encrypted symmetric key to the host computing device 148. As discussed above (see blocks 824 and 826 of FIG. 8), the host computing device 148 may then use the host private key to decrypt the encrypted symmetric key and thereafter use the decrypted symmetric key to decrypt the encrypted virtual machine image.

EXAMPLES

Illustrative examples of the devices, systems, and methods disclosed herein are provided below. An embodiment of the devices, systems, and methods may include any one or more, and any combination of, the examples described below.

Example 1 includes a key management server for generating cryptographic keys. The key management server includes a key database to store cryptographic keys; and a key management module to (i) generate an asymmetric key pair including a customer public key and a customer private key for a customer, (ii) decrypt an encrypted symmetric key received by the communication module, and (iii) re-encrypt the decrypted symmetric key using a public key of a host computing device of a cloud service provider; a communication module to (i) transfer the customer public key generated by the key management module to the cloud service provider, (ii) receive the symmetric key encrypted with the customer public key from a host computing device of the cloud service provider in response to transferring the customer public key to the cloud service provider, and (iii) transferring the re-encrypted symmetric key to the host computing device.

Example 2 includes the subject matter of Example 1, and wherein the asymmetric key pair is generated in response to a request by the cloud service provider to generate the asymmetric key pair.

Example 3 includes the subject matter of any of Examples 1 and 2, and wherein the communications module is to receive trust data from the host computing device.

Example 4 includes the subject matter of any of Examples 1-3, and further including a trust attestation module to attest the host computing device on the key management server as a function of the host trust data.

Example 5 includes the subject matter of any of Examples 1-4, and wherein (i) the key management module decrypts the encrypted symmetric key and re-encrypts the decrypted symmetric key and (ii) the communication module transfers the re-encrypted symmetric key in response to the key management server successfully attesting the host computing device.

Example 6 includes a host computing device for securely provisioning a virtual image, the host computing device comprising a security engine to (i) retrieve an encrypted virtual machine image from an object store of a cloud service provider; (ii) extract, from metadata of the encrypted virtual machine, a symmetric key encrypted with a customer public key, (iii) transmit the extracted encrypted symmetric key to a key management server, (iv) receive a symmetric key encrypted with a public key of the host computing device, (v) decrypt the host-encrypted symmetric key using a private key of the host device, and (vi) decrypt the encrypted virtual machine image using the decrypted symmetric key; and a virtual machine management module to provision the host computing device for a decrypted virtual machine image.

Example 7 includes the subject matter of Example 6, and wherein the metadata of the encrypted virtual machine comprises an open virtualization format manifest.

Example 8 includes the subject matter of any of Examples 6 and 7, and wherein the security engine comprises a trusted platform module.

Example 9 includes the subject matter of any of Examples 6-8, and wherein the host public key is generated by the trusted platform module using trusted execution technology.

Example 10 includes the subject matter of any of Examples 6-9, and further including a trust agent module to attest the host computing device to the key management server.

Example 11 includes the subject matter of any of Examples 6-10, and wherein the trust agent module attesting the host computing device to the key management comprises generating trust data as a function of hardware of the host computing device.

Example 12 includes the subject matter of any of Examples 6-11, and wherein the trust agent module attests the host computing device in response to the host computing device detecting an encryption tag in metadata of the encrypted virtual machine image.

Example 13 includes the subject matter of any of Examples 6-12, and wherein (i) the security agent receives the encrypted symmetric key, decrypts the symmetric key, and decrypts the encrypted virtual machine image and (ii) the virtual machine management module provisions the host computing device in response to the key management server successfully attesting the host computing device.

Example 14 includes a customer computing device for securely transmitting a virtual machine image. The customer computing device includes a data storage device to store cryptographic keys; a processor to establish authorized login credentials to a cloud service provider; a virtual machine agent to (i) generate a symmetric key, (ii) encrypt the virtual machine image using the symmetric key, and (iii) encrypt the symmetric key using a public key of a customer computing device; a communication module to (i) receive the public key of the customer computing device and the virtual machine agent from the cloud service provider, (ii) transmit the encrypted symmetric key to the cloud service provider, and (iii) transfer the encrypted virtual machine image to an object store of the cloud service provider.

Example 15 includes the subject matter of Example 14, and wherein the processor establishing authorized login credentials comprises receiving a password and authorization identification from the cloud service provider.

Example 16 includes the subject matter of any of Examples 14 and 15, and wherein the communication module receiving the customer public key comprises receiving a public key certificate including the customer public key.

Example 17 includes the subject matter of any of Examples 14-16, and further including the processor to install the virtual machine agent on the customer computing device.

Example 18 includes the subject matter of any of Examples 14-17, and further including the virtual machine agent to update metadata of the encrypted virtual machine image to incorporate an encryption tag.

Example 19 includes the subject matter of any of Examples 14-18, and wherein the communication module transmitting the encrypted symmetric key to the cloud service provider comprises embedding the encrypted symmetric cryptographic key in the metadata of the encrypted virtual machine image.

Example 20 includes a system for running a secure virtual image. The system includes a portal of a cloud service provider to (i) send a request to a key management server to generate an asymmetric key pair including a customer public key and a customer private key for a computing device of a customer of the cloud service provider, (ii) receive the customer public key from the key management server, and (iv) transmit the customer public key and a virtual machine agent to the customer computing device, the virtual machine agent to encrypt a virtual machine image of the customer computing device; an object store of the cloud service provider to receive the encrypted virtual machine image from the customer computing device; a host management module to determine a host computing device of the cloud service provider to provision for a virtual machine image associated with the encrypted virtual machine image; the host computing device to (i) retrieve the encrypted virtual machine image from the object store of the cloud service provider, (ii) extract, from metadata of the encrypted virtual machine image, the encrypted symmetric key, (iii) transmit the extracted encrypted symmetric key to the key management server, (iv) receive a symmetric key encrypted with a public key of the host computing device in response to transmitting the extracted key to the key management server, and (v) decrypt the encrypted virtual machine image.

Example 21 includes the subject matter of Example 20, and wherein the portal of the cloud service provider to establish secure login credentials for the customer computing device.

Example 22 includes the subject matter of any of Examples 20 and 21, and wherein the host management module determines a host computing device as a function of a trusted compute pool policy.

Example 23 includes the subject matter of any of Examples 20-22, and wherein the portal of the cloud server provider receiving the customer public key from the key management server comprises receiving a public key certificate including the customer public key.

Example 24 includes the subject matter of any of Examples 20-23, and wherein the metadata of the encrypted virtual machine comprises an open virtualization format manifest.

Example 25 includes the subject matter of any of Examples 20-24, and further including the host computing device to (i) generate trust data as a function of hardware of the computing device and (ii) attest the host computing device to the key management server as a function of the trust data.

Example 26 includes the subject matter of any of Examples 20-25, and wherein the public key of a host computing device and a private key of the host computing device is generating by a trusted platform module of the host computing device using trusted execution technology.

Example 27 includes the subject matter of any of Examples 20-26, and wherein the host computing device decrypts the encrypted virtual machine image by decrypting the host-encrypted symmetric key using the private key of the host device; and decrypting the encrypted virtual machine image using the decrypted symmetric key.

Example 28 includes a method for generating cryptographic keys. The method includes generating, on a key management server, an asymmetric key pair including a customer public key and a customer private key for a customer; transferring the customer public key to a cloud service provider; storing the customer private key in a key database of the key management server; receiving a symmetric key encrypted with the customer public key from a host computing device of the cloud service provider; decrypting the encrypted symmetric key using the customer private key; receiving a host public key from a host computing device of the cloud service provider; re-encrypting the decrypted symmetric key using the host public key; and transferring the re-encrypted symmetric key to the host computing device.

Example 29 includes the subject matter of Example 28, and wherein generating the asymmetric key pair is in response to a request to generate the asymmetric key pair by the cloud service provider.

Example 30 includes the subject matter of any of Examples 28 and 29, and further including receiving trust data from the host computing device.

Example 31 includes the subject matter of any of Examples 28-30, and further including attesting the host computing device on the key management server as a function of the host trust data.

Example 32 includes the subject matter of any of Examples 28-31, and wherein decrypting the encrypted symmetric key, re-encrypting the decrypted symmetric key, and transferring the re-encrypted symmetric key are in response to the key management server successfully attesting the host computing device.

Example 33 includes a computing device having a processor and a memory having stored therein a plurality of instructions that when executed by the processor cause the computing device to perform the method of any of Examples 28-32.

Example 34 includes one or more machine readable storage media comprising a plurality of instructions stored thereon that in response to being executed result in a computing device performing the method of any of Example 28-32.

Example 35 includes a method for running a secure virtual machine image. The method includes retrieving with a host computing device of a cloud service provider an encrypted virtual machine image from an object store of the cloud service provider to be provisioned on the host computing device; extracting, from metadata of the encrypted virtual machine image, a symmetric key encrypted with a customer public key; transmitting the extracted encrypted symmetric key to a key management server; receiving a symmetric key encrypted with a public key of the host computing device in response to transmitting the extracted symmetric key; decrypting the encrypted symmetric key using a private key of the host device; decrypting the encrypted virtual machine image using the decrypted symmetric key; and provisioning the host computing device for a decrypted virtual machine image.

Example 36 includes the subject matter of Example 35, and further including attesting the host computing device to the key management server.

Example 37 includes the subject matter of any of Examples 35 and 36, and wherein attesting the host computing device comprises generating trust data as a function of hardware of the host computing device.

Example 38 includes the subject matter of any of Examples 35-37, and wherein attesting the host computing device is in response to the host computing device detecting an encryption tag in metadata of the encrypted virtual machine image.

Example 39 includes the subject matter of any of Examples 35-38, and wherein receiving the encrypted symmetric key, decrypted the symmetric key, decrypting the encrypted virtual machine image, and provisioning the host computing device are in response to the key management server successfully attesting the host computing device.

Example 40 includes a computing device having a processor and a memory having stored therein a plurality of instructions that when executed by the processor cause the computing device to perform the method of any of Examples 35-39.

Example 41 includes one or more machine readable storage media including a plurality of instructions stored thereon that in response to being executed result in a computing device performing the method of any of Examples 35-39.

Example 42 includes a method for securely transmitting a virtual machine image. The method includes establishing, with a customer computing device, authorized login credentials to a cloud service provider; receiving, with a customer computing device, a customer public key and a virtual machine agent from the cloud service provider; generating a symmetric cryptographic key on a customer computing device; encrypting the virtual machine image using the symmetric cryptographic key; encrypting the symmetric cryptographic key using the customer public key; transmitting the encrypted symmetric cryptographic key to the cloud service provider; and transferring the encrypted virtual machine image from the customer computing device to an object store of the cloud service provider.

Example 43 includes the subject matter of Example 42, and further including updating metadata of the encrypted virtual machine image to incorporate an encryption tag.

Example 44 includes the subject matter of any of Examples 42 and 43, and wherein transmitting the encrypted symmetric cryptographic key to the cloud service provider comprises embedding the encrypted symmetric cryptographic key in the metadata of the encrypted virtual machine image.

Example 45 includes the subject matter of any of Examples 42-44, and wherein establishing authorized login credentials comprises receiving a password and authorization identification from the cloud service provider.

Example 46 includes the subject matter of any of Examples 42-45, and further including installing the virtual machine agent on the customer computing device.

Example 47 includes the subject matter of any of Examples 42-46, and wherein receiving a customer public key comprises receiving a public key certificate including the customer public key.

Example 48 includes a computing device having a processor and a memory having stored therein a plurality of instructions that when executed by the processor cause the computing device to perform the method of any of Examples 42-47.

Example 49 includes one or more machine readable storage media having a plurality of instructions stored thereon that in response to being executed result in a computing device performing the method of any of Examples 42-47.

Example 48 includes a method for receiving a secure virtual machine image. The method includes sending a request, from a cloud service provider, to a key management server to generate an asymmetric key pair including a customer public key and a customer private key for a computing device of a customer of the cloud service provider; receiving, with the cloud service provider, the customer public key from the key management server; transmitting, from the cloud service provider, the customer public key and a virtual machine agent to the customer computing device, the virtual machine agent to encrypt a virtual machine image of the customer computing device; receiving, with an object store of the cloud service provider, an encrypted virtual machine image from the customer computing device; receiving, with the cloud service provider, an encrypted symmetric key encrypted with the customer public key from the customer computing device; and determining a host computing device to provision for a virtual image associated with the encrypted virtual machine image.

Example 49 includes the subject matter of Example 48, and further including establishing secure login credentials for the customer computing device.

Example 50 includes the subject matter of any of Examples 48 and 49, and further including preparing the host computing device for virtual machine image provisioning.

Example 51 includes the subject matter of any of Examples 48-50, and wherein the host computing device is determined as a function of a trusted compute pool policy.

Example 52 includes the subject matter of any of Examples 48-51, and wherein receiving the customer public key from the key management server comprises receiving a public key certificate including the customer public key.

Example 53 includes a computing device having a processor and a memory having stored therein a plurality of instructions that when executed by the processor cause the computing device to perform the method of any of Examples 48-52.

Example 54 includes one or more machine readable storage media comprising a plurality of instructions stored thereon that in response to being executed result in a computing device performing the method of any of Examples 48-52.

The invention claimed is:

1. A host computing device for securely provisioning a virtual image, the host computing device comprising:
   a security engine to (i) retrieve an encrypted virtual machine image from an object store of a cloud service provider; (ii) extract, from metadata of the encrypted virtual machine, a symmetric key encrypted with a customer public key associated with a customer computing device, (iii) transmit the extracted encrypted symmetric key to a key management server, (iv) receive, from the key management server, the symmetric key encrypted with a public key of the host computing device, (v) decrypt the host-encrypted symmetric key using a private key of the host computing device, and (vi) decrypt the encrypted virtual machine image using the decrypted symmetric key;
   a trust agent module to attest the host computing device to the key management server; and
   a virtual machine management module to provision the host computing device for a decrypted virtual machine image,
   wherein (i) the security engine receives the encrypted symmetric key, decrypts the symmetric key, and decrypts the encrypted virtual machine image and (ii) the virtual machine management module provisions the host computing device in response to the key management server successfully attesting the host computing device.

2. The host computing device of claim 1, wherein the metadata of the encrypted virtual machine comprises an open virtualization format manifest.

3. The host computing device of claim 1, wherein the host public key is generated by a trusted platform module of the security engine using trusted execution technology.

4. The host computing device of claim 1, wherein to attest the host computing device to the key management comprises to generate trust data as a function of hardware of the host computing device.

5. The host computing device of claim 1, wherein the trust agent module attests the host computing device in response to the host computing device detecting an encryption tag in metadata of the encrypted virtual machine image.

6. One or more non-transitory machine-readable storage media comprising a plurality of instructions stored thereon that, in response to execution by a host computing device, cause the host computing device to:
   retrieve an encrypted virtual machine image from an object store of a cloud service provider to be provisioned on the host computing device;
   extract, from metadata of the encrypted virtual machine, a symmetric key encrypted with a customer public key associated with a customer computer device;

transmit the extracted encrypted symmetric key to a key management server;
attest the host computing device to the key management server;
receive, from the key management server, the symmetric key encrypted with a public key of the host computing device in response to transmission of the extracted symmetric key and successful attestation of the host computing device by the key management server;
decrypt the host-encrypted symmetric key using a private key of the host computing device;
decrypt the encrypted virtual machine image using the decrypted symmetric key; and
provision the host computing device for a decrypted virtual machine image.

7. The one or more non-transitory machine-readable storage media of claim 6, wherein the metadata of the encrypted virtual machine comprises an open virtualization format manifest.

8. The one or more non-transitory machine-readable storage media of claim 6, wherein the plurality of instructions further cause a trusted platform module of the host computing device to generate the public key of the host computing device using trusted execution technology.

9. The one or more non-transitory machine-readable storage media of claim 6, wherein to attest the host computing device comprises to attest the host computing device in response to detection of an encryption tag in metadata of the encrypted virtual machine image.

10. The one or more non-transitory machine-readable storage media of claim 6, wherein to attest the host computing device comprises to generate trust data as a function of hardware of the host computing device.

11. A method for running a secure virtual machine image, the method comprising:
retrieving, by a host computing device of a cloud service provider, an encrypted virtual machine image from an object store of the cloud service provider to be provisioned on the host computing device;
extracting, from metadata of the encrypted virtual machine image, a symmetric key encrypted with a customer public key;
transmitting the extracted encrypted symmetric key to a key management server;
attesting the host computing device to the key management server;
receiving a symmetric key encrypted with a public key of the host computing device in response to transmitting the extracted symmetric key and successful attestation of the host computing device by the key management server;
decrypting the encrypted symmetric key using a private key of the host device;
decrypting the encrypted virtual machine image using the decrypted symmetric key; and
provisioning the host computing device for a decrypted virtual machine image.

12. The method of claim 11, wherein attesting the host computing device comprises generating trust data as a function of hardware of the host computing device.

13. The method of claim 11, wherein attesting the host computing device is in response to the host computing device detecting an encryption tag in metadata of the encrypted virtual machine image.

14. The method of claim 11, wherein the metadata of the encrypted virtual machine comprises an open virtualization format manifest.

* * * * *